(12) United States Patent
Xing et al.

(10) Patent No.: US 11,417,935 B2
(45) Date of Patent: Aug. 16, 2022

(54) COMPONENT FOR COLLECTING CURRENT AND BATTERY

(71) Applicant: Contemporary Amperex Technology Co., Limited, Ningde (CN)

(72) Inventors: Chengyou Xing, Ningde (CN); Yulian Zheng, Ningde (CN); Taosheng Zhu, Ningde (CN); Zhijun Guo, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 158 days.

(21) Appl. No.: 16/244,504

(22) Filed: Jan. 10, 2019

(65) Prior Publication Data

US 2019/0221821 A1 Jul. 18, 2019

(30) Foreign Application Priority Data

Jan. 16, 2018 (CN) .......................... 201810039458.6

(51) Int. Cl.
*H01M 50/531* (2021.01)
*H01M 50/50* (2021.01)
(Continued)

(52) U.S. Cl.
CPC ....... *H01M 50/531* (2021.01); *H01M 10/049* (2013.01); *H01M 10/0436* (2013.01);
(Continued)

(58) Field of Classification Search
CPC ...... H01M 10/049; H01M 2/20; H01M 2/202; H01M 2/26; H01M 50/50; H01M 50/502; H01M 50/531
See application file for complete search history.

(56) References Cited

U.S. PATENT DOCUMENTS 4,663,247 A * 5/1987 Smilanich ............. H01M 50/50
429/94
2010/0247989 A1* 9/2010 Kim ..................... H01M 10/058
429/94
(Continued)

FOREIGN PATENT DOCUMENTS

CN 1832228 A 9/2006
CN 101132060 A 2/2008
(Continued)

OTHER PUBLICATIONS

Extended European Search Report for European Application No. 19151542.8 dated Mar. 13, 2019.
(Continued)

*Primary Examiner* — Sadie White
(74) *Attorney, Agent, or Firm* — Kilpatrick Townsend & Stockton LLP

(57) ABSTRACT

The present disclosure provides a component for collecting a current and a battery. The component for collecting a current comprises an introducing body and a connection body bendably arranged relative to the introducing body. The introducing body comprises a holding arrangement. The holding arrangement is used for fixing the introducing body when the connection body is bent. When the connection body is bent, an operator can use a clamping tool to fixedly clamp the holding arrangement arranged on the introducing body, so that the stress applied on the component for collecting a current can be transferred to the position of the clamping tool when the connection body is bent, thereby reducing the stress from damaging electrode assemblies.

20 Claims, 4 Drawing Sheets

(51) Int. Cl.
  *H01M 50/502* (2021.01)
  *H01M 50/543* (2021.01)
  *H01M 10/04* (2006.01)
  *H01M 10/058* (2010.01)
  *H01M 10/0525* (2010.01)

(52) U.S. Cl.
  CPC ......... *H01M 10/058* (2013.01); *H01M 50/50* (2021.01); *H01M 50/502* (2021.01); *H01M 50/543* (2021.01); *H01M 10/0525* (2013.01)

(56) References Cited

U.S. PATENT DOCUMENTS

| | | | | |
|---|---|---|---|---|
| 2010/0323239 | A1* | 12/2010 | Kim | H01M 50/147 429/181 |
| 2011/0250491 | A1* | 10/2011 | Kim | H01M 50/579 429/176 |
| 2012/0058389 | A1* | 3/2012 | Guen | H01M 50/531 429/179 |
| 2012/0064383 | A1* | 3/2012 | Tonomura | H01M 10/613 429/99 |
| 2012/0070720 | A1 | 3/2012 | Aizawa et al. | |
| 2012/0135283 | A1* | 5/2012 | Lee | H01M 10/052 429/82 |
| 2013/0095372 | A1* | 4/2013 | Kim | H01M 50/572 429/178 |
| 2013/0196229 | A1* | 8/2013 | Shiraishi | H01M 50/172 429/211 |
| 2013/0202931 | A1* | 8/2013 | Lee | H01M 4/5825 429/94 |
| 2013/0330593 | A1* | 12/2013 | Kim | H01M 50/531 429/179 |
| 2014/0377639 | A1* | 12/2014 | Kwak | H01M 50/538 429/179 |
| 2015/0024259 | A1* | 1/2015 | Lee | H01M 50/528 429/178 |
| 2015/0044526 | A1* | 2/2015 | Guen | H01M 50/528 429/61 |
| 2015/0270527 | A1 | 9/2015 | Sasaki et al. | |
| 2015/0287999 | A1* | 10/2015 | Guen | H01M 2/26 429/179 |
| 2015/0303439 | A1* | 10/2015 | Bae | H01M 10/0413 429/61 |
| 2016/0322673 | A1* | 11/2016 | Meintschel | H01M 10/4207 |

FOREIGN PATENT DOCUMENTS

| | | |
|---|---|---|
| CN | 101728565 A | 6/2010 |
| CN | 201796895 U | 4/2011 |
| CN | 103050656 A | 4/2013 |
| CN | 104103779 A | 10/2014 |
| CN | 104600234 A | 5/2015 |
| EP | 2182566 A1 | 5/2010 |
| JP | 2000200594 A | 7/2000 |
| JP | 2005183359 A | 7/2005 |
| JP | 2006164558 A | 6/2006 |
| JP | 2006278013 A | 10/2006 |
| JP | 2013073755 A | 4/2013 |
| WO | 2018235768 A1 | 12/2018 |

OTHER PUBLICATIONS

Search Report for Chinese Patent Application No. 201810039458.6 dated Jul. 27, 2020.
Search Report for Chinese Patent Application No. 201810039458.6 dated Apr. 16, 2020.
Office Action for Chinese Patent Application No. 201810039458.6 dated Jul. 27, 2020.

* cited by examiner

COMPONENT FOR COLLECTING CURRENT AND BATTERY

CROSS-REFERENCE TO RELATED APPLICATION

This application claims the priority benefit of Chinese Patent Application Serial. No. 201810039458.6, filed on 16 Jan. 2018, the entire content of which is incorporated herein by reference.

TECHNICAL FIELD

The present disclosure relates to the technical field of energy storage components, in particular to a component for collecting a current and a battery.

BACKGROUND

Lithium-ion batteries are widely used in portable electronic devices such as mobile phones, digital video cameras and laptop computers due to their high energy density, high power density, repetitively recyclable use, and durable storage. Lithium-ion batteries also have an extensive prospect in their use in electric vehicles such as electric cars and electric motorcycles, as well as large-and-middle-sized electric equipment such as energy storage facilities.

With improvement of electric vehicle technologies, electric vehicles are increasingly making their way into people's daily lives. While safety performance is demanded from lithium-ion batteries which provide energy to electric vehicles, higher energy density is more and more demanded from cells. In order to improve energy density of an electrode assembly, a component for collecting a current of a battery is bent after the component for collecting a current is welded to a tab of an electrode assembly, thereby reducing internal space occupied by the component for collecting a current, in the existing technologies.

SUMMARY

Some embodiments of the present disclosure provide a component for collecting a current and a battery to reduce damage to an electrode assembly when bending the component for collecting a current.

Some embodiments of the present disclosure provide a component for collecting a current for electrically connecting an electrode assembly to the outside. The component for collecting a current comprises an introducing body and a connection body bendably arranged relative to the introducing body. The introducing body comprises a holding arrangement to be fixed when the connection body is bent.

In some embodiments, the introducing body further includes an inner connecting structure connecting the holding arrangement and the connection body. The holding arrangement protrudes relative to the inner connecting structure.

In some embodiments, the inner connecting structure is in the form of a sheet. A surface of the holding arrangement and a surface of the inner connecting structure are not on a same surface.

In some embodiments, the holding arrangement includes a first holding part and a second holding part that are respectively arranged at both ends of the inner connecting structure.

In some embodiments, the introducing body includes an outer connecting structure for electrically connecting to the outside. The first holding part is arranged between the outer connecting structure and the inner connecting structure, and the second holding part is arranged at an end of the inner connecting structure away from the outer connecting structure.

In some embodiments, there are two connecting bodies respectively located on two lateral sides of the introducing body.

In some embodiments, the component for collecting a current is formed integrally by a piece of metal that is in the form of a sheet.

Some embodiments of the present disclosure provide a battery. The battery includes an electrode assembly and a component for collecting a current. The component is arranged to electrically connect an electrode assembly to the outside. The component for collecting a current includes an introducing body and a connection body. The connection body is bendably connected to the introducing body. The introducing body comprises a holding arrangement and the holding arrangement is configured to be fixed when the connection body is bent. The connection body connected to a tab of the electrode assembly, and the introducing body electronically connected to the outside.

In some embodiments, the battery includes a cap plate arranged on top of the electrode assembly, the holding arrangement is arranged on a side of the electrode assembly, and a protruding distance of the holding arrangement relative to the side of the electrode assembly is shorter than a protruding distance of the cap plate edge relative to the side of the electrode assembly.

In some embodiments, the introducing body extends along the side of the electrode assembly, and an accommodating space is formed between a surface of the holding arrangement adjacent to the electrode assembly and a surface of the electrode assembly.

According to the component for collecting a current and the battery provided by some embodiments of the present disclosure, the component for collecting a current includes the introducing body and the connection body bendably arranged relative to the introducing body, and the introducing body includes the holding arrangement to be fixed when bending the connection body. When bending the connection body of some embodiments of the present disclosure, an operator may fix and clamp the holding arrangement arranged on a holding body by using a clamping tool, so that a stress applied on the component for collecting a current may be transferred to the clamping tool when bending the connection body, in order to reduce the stress from damaging the electrode assembly.

Further features of some embodiments of the present disclosure and their advantages will become apparent from the following detailed description on exemplary embodiments of the present disclosure with reference to the drawings.

BRIEF DESCRIPTION OF THE DRAWINGS

As a part of the present disclosure, drawings illustrated here are used to provide further understanding of the present disclosure. The schematic embodiments and description of the present disclosure are used for describing the present disclosure but do not constitute an inappropriate limit to the present disclosure. In the drawings.

Figure 1:
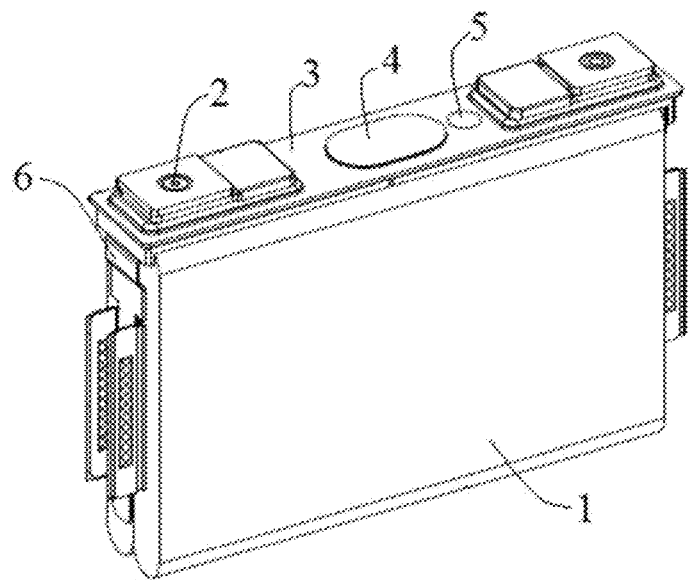
FIG. 1 is a schematic perspective view of a battery when a component for collecting a current according to some embodiments of the present disclosure is in a first state.

the reference signs represents respectively:

1—electrode assembly; 11—tab; 2—electrode terminal; 3—cap plate; 4—vent; 5—electrolyte injection hole; 6—component for collecting a current; 61—inner connecting structure; 62—first holding part; 63—connection body; 64—second holding part; 65—outer connecting structure.

DETAILED DESCRIPTION

Technical solutions in embodiments of the present disclosure are clearly and completely described in the following with reference to the accompanying drawings in the embodiments of the present disclosure. It is obvious that the described embodiments are only some rather than all embodiments of the present disclosure. The following description on at least one exemplary embodiment is merely illustrative, but by no means limits the present disclosure and its application or use. Based on the embodiments in the present disclosure, all other embodiments obtained by those skilled in the art without creative efforts fall into the scope to be protected in the present disclosure.

Unless defined otherwise, relative arrangements, expressions with figures and values in means and steps illustrated in these embodiments do no limit the scope of the present disclosure. Besides, it shall be appreciated that in order to facilitate description, dimensions of the portions shown in the drawings are not necessarily drawn to practical scale. Techniques, methods and devices known by ordinarily skilled persons in related arts may not be discussed in detail. Said techniques, methods and devices shall, in appropriate cases, be considered a part of a granted specification. In all examples presented and discussed here, any specific values shall be described as exemplary rather than limiting. Therefore, other examples of the embodiments may contain different values. It shall be noted that similar signs and letters represent similar items in the following drawings. Therefore, once a certain item is defined in one figure, there would not be necessary to perform a further discussion on it in the figures that follow.

In order to facilitate description, spatially relative terms such as "above", "over", "on", and "upper" and the like may be used for describing a spatial location relationship between one component or feature and another component or feature. It shall be understood that spatially relative items aim to encompass different orientations in use or operation in addition to the orientation of the device described. For example, if the device in the figure is inverted, a device described as "over another device or configuration" or "above another device or configuration" will be defined as "under another device or configuration" or "below another device or configuration". Thus, the exemplary term "over" may include both "over" and "under". The device may also be positioned in other different ways (rotated by 90 degrees or at other orientations) and the spatial relative description used here will be explained accordingly.

However, it is found that when bending the existing component for collecting a current, the component for collecting a current is deformed and pressed against the electrode assembly, causing damage to the electrode assembly. Therefore, some embodiments of the present disclosure provide a component for collecting a current and a battery to reduce damage to an electrode assembly when bending the component for collecting a current.

With reference to FIGS. 1 to 4, a component for collecting a current 6 in an embodiment of the present disclosure is used to electrically connect an electrode assembly 1 to the outside. The component for collecting a current 6 includes an introducing body and a connection body 63 which is bendably arranged relative to the introducing body, and the introducing body includes a holding arrangement to be fixed when bending the connection body 63. In some embodiments, a holding arrangement to be fixed when bending the connection body can be interpreted as: when the connection body 63 is bent, the holding arrangement is used to place an external tool, and a stress applied on the connection body 63 can be transferred to the external tool. Therefore, the holding arrangement can avoid the stress applied to the connection body 63 to transfer to the electrode assembly and reduce the damage to the electrode assembly. For example, the holding arrangement is a protrusion structure with a shape and is formed by a portion of the introducing body. The protrusion structure is used to place the external tool. The shape of the protrusion structure can be disposed according to actual requirements. The shape may be trapezoid, curved, square or the like.

Figure 3:
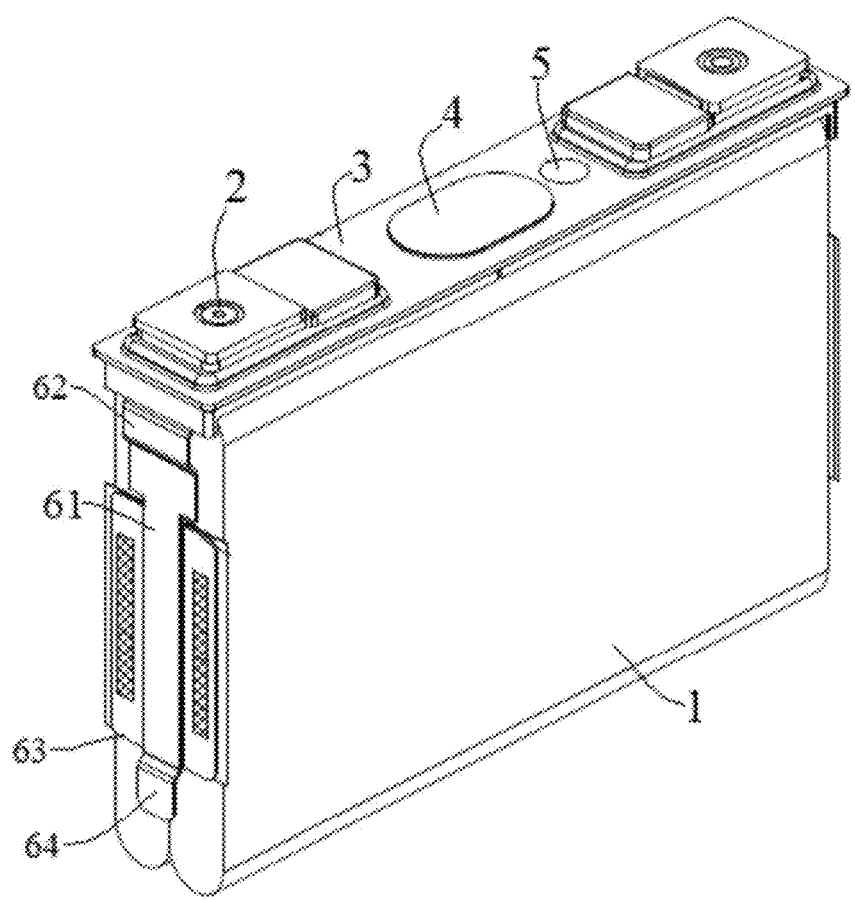
FIG. 3 is a schematic perspective view of the battery when the component for collecting a current according to some embodiments of the present disclosure is in a second state.

FIG. 1 is a schematic view when a component for collecting a current according to the present embodiment is in a first state, while FIG. 3 is a schematic view when a component for collecting a current according to the present embodiment is in a second state. The connection body 63 is bent relative to the introducing body to transform from the first state to the second state.

When bending the connection body of the present embodiment, an operator may fix and clamp the holding arrangement arranged on a holding body by using a clamping tool, so that a stress applied on the component for collecting a current may be transferred to the clamping tool when bending the connection body 63, in order to avoid the stress from damaging the electrode assembly.

The present embodiment exemplarily shows a prismatic cell. However, other embodiments of the present disclosure may further be batteries of various other shapes like cylindrical cells and the like.

As shown in FIG. 1, the battery of this embodiment includes an electrode assembly, a cap plate 3 arranged on top of the electrode assembly 1, an electrode terminal 2 drilled through the cap plate 3, a vent 4 and an electrolyte injection hole 5 arranged on the cap plate 3. The component for collecting a current 6 are arranged on sides of the electrode assembly 1 and are respectively connected to the tabs and the electrode terminals to electrically connect the electrode assembly to the outside. The component for collecting a current 6 includes a connection body 63 and an introducing body. The connection body 63 is connected to a tab, for example, by ultrasonic welding, resistance welding or the like. The introducing body is used to introduce electricity of the tab to the outside of the electrode assembly.

Figure 2:
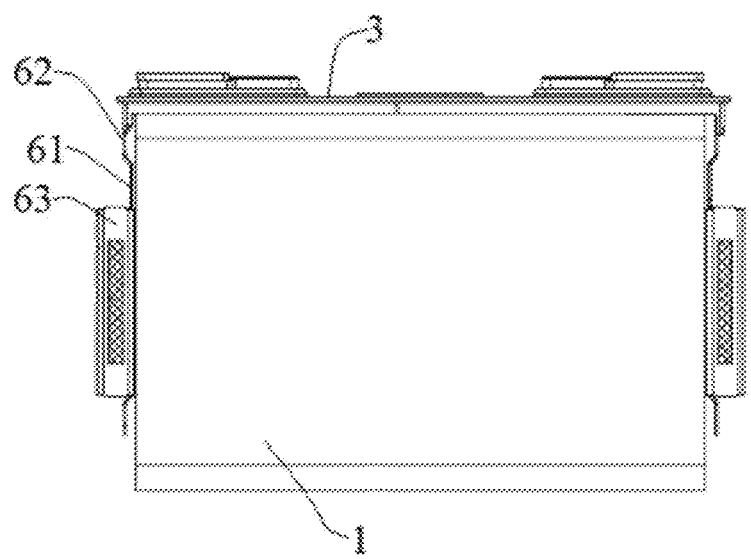
FIG. 2 is a schematic front view of the battery shown in FIG. 1.

In some embodiments, the introducing body further includes an inner connecting structure 61 connecting the holding arrangement and the connection body 63. The holding arrangement protrudes relative to the inner connecting structure 61 and in a direction that is away from the electrode assembly 1. As shown in FIG. 2, the inner connecting structure 61 is arranged close to a side of the electrode assembly. Therefore, protruding the holding arrangement away from the electrode assembly 1 leaves space and allows the operator to use a tool to fix and clamp the holding arrangement when bending the connection body 63, thereby facilitating fixing the holding arrangement to avoid damage to the electrode assembly. That is, the introducing body extends along the side of the electrode assembly, and an accommodating space is formed between a surface of the holding arrangement adjacent to the electrode assembly and a surface of the electrode assembly. The tool to fix and clamp the holding arrangement can be placed in the accommodating space.

In the present embodiment, specifically, as shown in FIGS. 1 to 4, the inner connecting structure 61 is in the form of a sheet. When mounted on the electrode assembly, the inner connecting structure 61 extends in its longitudinal direction along the side of the electrode assembly and is arranged adjacent to the side of the electrode assembly. The holding arrangement of the present embodiment includes a first holding part 62 and a second holding part 64 which are respectively arranged at longitudinal ends of the inner connecting structure 61. While bending the connection body of the present embodiment, the operator fixes both the first holding part 62 and the second holding part 64 to better fix the introducing body, so as to prevent it from deforming and pressing against the electrode assembly to damage the cell.

The introducing body further includes an outer connecting structure 65 to be electrically connected to the outside. The outer connecting structure 65 is provided with a connecting hole for connecting to the electrode terminal 2 that is connected to the outside. The first holding part 62 is arranged between the outer connecting structure 65 and the inner connecting structure 61. The second holding part 64 is arranged at an end of the inner connecting structure 61 away from the outer connecting structure 65.

Figure 4:
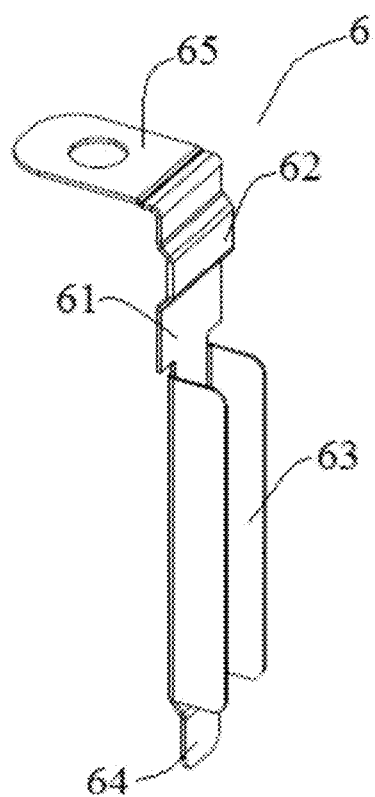
FIG. 4 is a schematic perspective view of the component for collecting a current according to some embodiments of the present disclosure.

As shown in FIG. 4, there is a gap between a surface of the first holding part 62 adjacent to the electrode assembly 1 and a surface of the inner connecting structure 61 adjacent to the electrode assembly 1; and there is a gap between a surface of the second holding part 64 adjacent to the electrode assembly 1 and the surface of the inner connecting structure 61 adjacent to the electrode assembly 1. When bending the connection body, the first holding part 62 and the second holding part 64 may be fixed by reaching out the clamping tool into the gaps. In some embodiments, the gap can be understood as: the surface of the holding arrangement and the surface of the inner connecting structure 61 are not on a same surface, so that there is a gap between the holding arrangement and the side of the electrode assembly.

A cross section of the first holding part 62 is a trapezoid. In other embodiments, the cross section of the first holding part 62 may further be curved or a square or the like. One end of the second holding part 64 is connected to the inner connecting structure 61, while the other end is randomly arranged.

It is worth noting that the holding arrangement should not be limited in including a first holding part 62 and a second holding part 64. In some embodiments, any one of the first holding part 62 and the second holding part 64 can be arranged to enable a operator to use a tool to fix and clamp the first holding part 62 or the second holding part 64, so that a stress applied on the component for collecting a current may be transferred to the clamping tool when bending the connection body 63, in order to reduce the stress from damaging the electrode assembly.

As shown in FIG. 4, the component for collecting a current 6 in this embodiment is formed integrally by a piece of metal that is in the form of a sheet. The outer connecting structure 65 is arranged substantially perpendicular to the inner connecting structure 61. The first holding part 62 and the second holding part 64 also protrude relative to the inner connecting structure. The component for collecting a current of the present embodiment can be formed by bending the sheet-shaped piece of metal. The component for collecting a current is simple in its manufacturing process, the cost of manufacturing the component is saved and it is advantageous for popularization in practical production.

Figure 5:
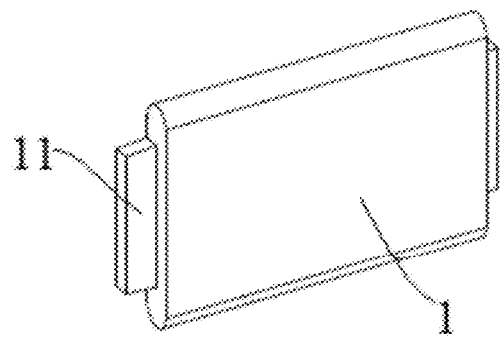
FIG. 5 is a schematic perspective view of an electrode assembly in FIG. 1.
Figure 6:
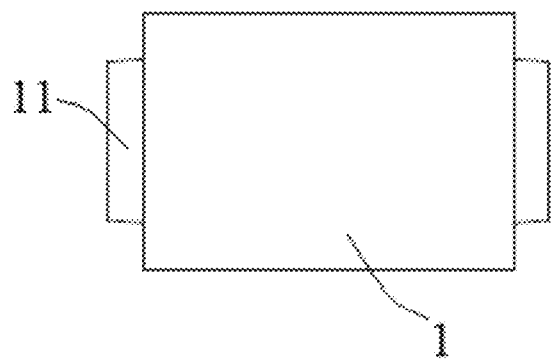
FIG. 6 is a schematic front view of the electrode assembly shown in FIG. 5.

As shown in FIGS. 5 and 6, tabs 11 are provided at both sides of the electrode assembly in its length direction. In the thickness direction of the electrode assembly 1, the tabs 11 are provided adjacent to one side of the electrode assembly. And in the width direction of the electrode assembly, the tabs 11 are provided in the middle of the electrode assembly 1.

Figure 7:
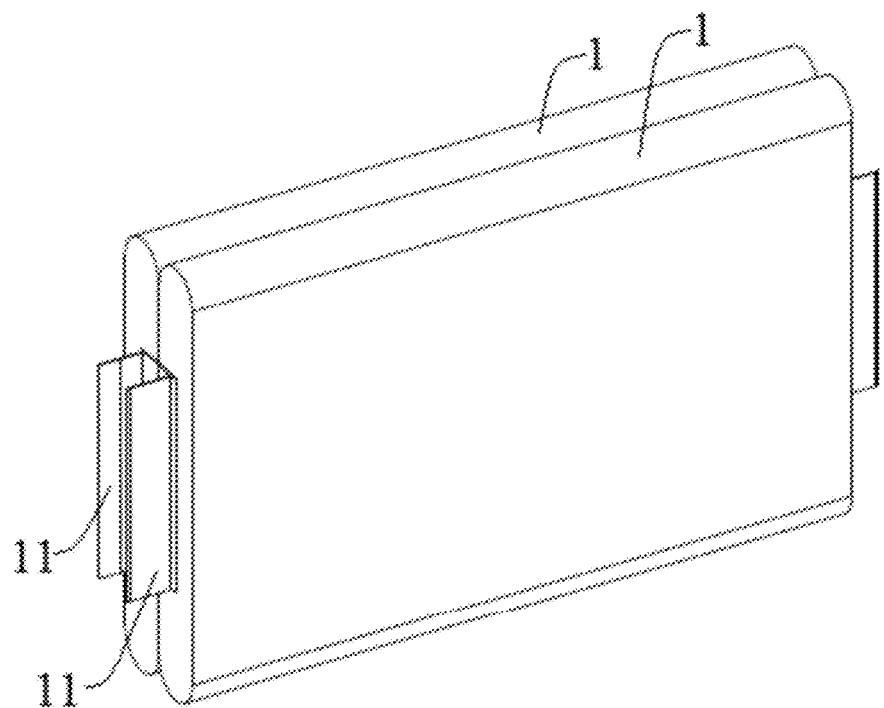
FIG. 7 is a schematic perspective view of two electrode assemblies in FIG. 1.
Figure 8:
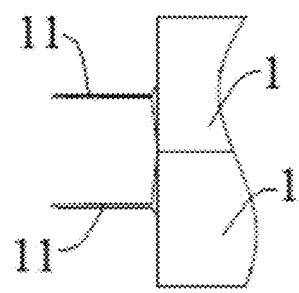
FIG. 8 is a schematic top view of the two electrode assemblies in FIG. 7.

As shown in FIGS. 7 and 8, the battery of the present embodiment includes two electrode assemblies 1 arranged side by side, the tabs of the two electrode assemblies are generally parallel to each other.

In order to electrically connect the two electrode assemblies 1 to the outside, as shown in FIG. 4, there are two connecting bodies 63 in a component for collecting a current, the two connecting bodies 63 respectively located on two lateral sides of the introducing body. As shown in FIG. 2, the component for collecting a current is arranged between two tabs, and the two connecting bodies 63 respectively connect to the tabs of two electrode assemblies 1.

In order to prevent the holding arrangement from occupying additional internal space of the electrode assemblies, the holding arrangement of the present embodiment is arranged on the side of the electrode assembly 1. Besides, a protruding distance of the holding arrangement relative to the side of the electrode assembly 1 is shorter than a protruding distance of a cap plate 3 edge relative to the side of the electrode assembly 1.

Finally, it shall be noted that the above embodiments are only used to illustrate the technical solutions of the present disclosure and are not to be construed as limiting thereof; although the present disclosure is described in detail with reference to the preferred embodiments, those ordinarily skilled in the art shall understand that modifications may still be made to the embodiments of the present disclosure, or equivalent substitution may be performed to partial technical features without departing from the spirit of the technical solutions of the present disclosure, but the modifications and substitution shall be covered by the technical solutions that the present disclosure claims to protect.

What is claimed is:

1. A battery, comprising an electrode assembly and a component for collecting a current;
   wherein the component is configured to electrically connect the electrode assembly to an outside of the electrode assembly, the component comprises an introducing body and a connection body;
   wherein the connection body is bendably connected to the introducing body;
   wherein the introducing body comprises a holding arrangement and an inner connecting structure connecting the holding arrangement and the connection body, and the holding arrangement protrudes in a protruding direction away from the electrode assembly relative to the inner connecting structure, and the holding arrangement is configured to be fixed when the connection body is bent;

wherein the holding arrangement extends along a first plane, the inner connecting structure extends along a second plane substantially parallel to the first plane, and the second plane is substantially perpendicular to the protruding direction, and a surface of the holding arrangement facing to the electrode assembly is recessed in the protruding direction from a surface of the inner connecting structure facing to the electrode assembly, with a hollow space formed therebetween;

wherein the connection body is directly connected to a tab of the electrode assembly, and the introducing body is electrically connected to the outside of the electrode assembly.

2. The battery according to claim 1, wherein the battery further comprises a cap plate arranged on top of the electrode assembly, the holding arrangement arranged on a side of the electrode assembly, and a protruding distance of the recessed surface of the holding arrangement relative to the side of the electrode assembly is less than a protruding distance of the cap plate edge relative to the side of the electrode assembly.

3. The battery according to claim 2, wherein the introducing body extends along a side of the electrode assembly and under the cap plate, and an accommodating space is formed between a surface of the holding arrangement adjacent to the electrode assembly and a surface of the electrode assembly, the accommodating space comprises the hollow space.

4. The battery according to claim 1, wherein the holding arrangement is a protrusion structure with a shape and is formed by a portion of the introducing body.

5. The battery according to claim 1, wherein the inner connecting structure is in the form of a sheet, and a surface of the holding arrangement adjacent to the electrode assembly and a surface of the inner connecting structure adjacent to the electrode assembly are not on a same surface.

6. The battery according to claim 1, wherein the holding arrangement includes a first holding part and a second holding part that are respectively arranged at both longitudinal ends of the inner connecting structure.

7. The battery according to claim 6, wherein the introducing body includes an outer connecting structure for electrically connecting to the outside of the electrode assembly, the first holding part is arranged between the outer connecting structure and the inner connecting structure, and the second holding part is arranged at an end of the inner connecting structure away from the outer connecting structure.

8. The battery according to claim 7, wherein there are two connecting bodies respectively located on two lateral sides of the inner connecting structure.

9. The battery according to claim 1, wherein the component is formed integrally by a piece of metal that is in the form of a sheet.

10. The battery according to claim 1, wherein the holding arrangement is arranged at an end of the inner connecting structure.

11. The battery according to claim 1, wherein the introducing body includes an outer connecting structure for electrically connecting to the outside of the electrode assembly, the holding arrangement is arranged between the outer connecting structure and the inner connecting structure.

12. The battery according to claim 11, wherein the holding arrangement has a cross section being trapezoid.

13. The battery according to claim 1, wherein the holding arrangement has an end connected to the inner connecting structure, and an other end being a free end.

14. The battery according to claim 13, wherein the end of the holding arrangement is connected smoothly to the inner connecting structure.

15. The battery according to claim 13, wherein the holding arrangement extends beyond the connection body in a longitudinal direction of the inner connecting structure.

16. The battery according to claim 13, wherein the holding arrangement is formed by bending a sheet-shaped piece of metal.

17. The battery according to claim 1, wherein the introducing body includes an outer connecting structure for electrically connecting to the outside of the electrode assembly, the holding arrangement is arranged at an end of the inner connecting structure away from the outer connecting structure.

18. A battery comprising an electrode assembly and a component for collecting a current;

wherein the component is configured to electrically connect the electrode assembly to an outside of the electrode assembly, the component comprises an introducing body and a connection body;

wherein the connection body is bendably connected to the introducing body;

wherein the introducing body comprises a holding arrangement and an inner connecting structure connecting the holding arrangement and the connection body, and the holding arrangement protrudes in a protruding direction away from the electrode assembly relative to the inner connecting structure, and the holding arrangement is configured to be fixed when the connection body is bent;

wherein a portion of the holding arrangement extends along a first plane, the inner connecting structure extends along a second plane substantially parallel to the first plane, the second plane is substantially perpendicular to the protruding direction, and the portion of the holding arrangement is spaced from the inner connecting structure;

wherein the connection body is directly connected to a tab of the electrode assembly, and the introducing body is electrically connected to the outside of the electrode assembly.

19. The battery according to claim 18, wherein the introducing body extends along a side surface of the electrode assembly, and a hollow space is defined by the side surface of the electrode assembly and a surface of the holding arrangement facing to the side surface.

20. The battery according to claim 19, wherein a surface of the inner connecting structure facing to the side surface of the electrode assembly is located closer to the side surface than the surface of the holding arrangement.

* * * * *